United States Patent
Kenworthy et al.

(10) Patent No.: US 11,865,617 B2
(45) Date of Patent: Jan. 9, 2024

(54) METHODS AND APPARATUSES FOR WIDE-SPECTRUM CONSUMPTION OF OUTPUT OF ATOMIZATION PROCESSES ACROSS MULTI-PROCESS AND MULTI-SCALE ADDITIVE MANUFACTURING MODALITIES

(71) Applicant: Divergent Technologies, Inc., Los Angeles, CA (US)

(72) Inventors: Michael Kenworthy, Los Angeles, CA (US); Prabir Chaudhury, Los Angeles, CA (US); Michael Hoganson, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 96 days.

(21) Appl. No.: 17/411,685

(22) Filed: Aug. 25, 2021

(65) Prior Publication Data

US 2023/0063056 A1 Mar. 2, 2023

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B22F 10/34* (2021.01); *B22F 12/82* (2021.01);
(Continued)

(58) Field of Classification Search
CPC .......... B22F 10/85; B22F 10/28; B22F 10/34; B22F 12/82; B33Y 10/00; B33Y 30/00; B33Y 50/02; Y02P 10/25
(Continued)

(56) References Cited

U.S. PATENT DOCUMENTS

| | | | |
|---|---|---|---|
| 5,203,226 | A | 4/1993 | Hongou et al. |
| 5,742,385 | A | 4/1998 | Champa |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)
(Continued)

*Primary Examiner* — Michael J Brown
(74) *Attorney, Agent, or Firm* — ARENTFOX SCHIFF LLP

(57) ABSTRACT

Methods and apparatuses for identifying an additive manufacturing process for unused output material of an atomization process are described. The method comprises determining a set of characteristics of output material that is unused in a first additive manufacturing process. The method further comprises determining a respective set of parameters associated with respective input material of each of a set of other additive manufacturing processes. The method of further comprises identifying one of the set of other additive manufacturing processes that accepts the output material as input material based on the characteristics of the output material and based on respective sets of parameters.

18 Claims, 9 Drawing Sheets

(51) Int. Cl.
*B22F 10/34* (2021.01)
*B22F 12/82* (2021.01)
*B33Y 30/00* (2015.01)
*B33Y 50/02* (2015.01)
*B33Y 10/00* (2015.01)

(52) U.S. Cl.
CPC .............. *B33Y 10/00* (2014.12); *B33Y 30/00* (2014.12); *B33Y 50/02* (2014.12)

(58) Field of Classification Search
USPC .......................................................... 700/98
See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |

(56) References Cited

U.S. PATENT DOCUMENTS

| | | |
|---|---|---|
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |

(56) References Cited

U.S. PATENT DOCUMENTS

| | | |
|---|---|---|
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Eachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,719,929 B2 | 7/2020 | Craeghs et al. |
| 2006/0108783 A1 | 5/2006 | Ni et al. |
| 2014/0277669 A1 | 9/2014 | Nardi et al. |
| 2015/0266211 A1 | 9/2015 | Wolfgang et al. |
| 2017/0113344 A1 | 4/2017 | Schönberg |
| 2017/0144224 A1 | 5/2017 | Demuth et al. |
| 2017/0173691 A1 | 6/2017 | Jonasson |
| 2017/0341309 A1 | 11/2017 | Piepenbrock et al. |
| 2020/0189000 A1* | 6/2020 | LaTour .................. B22F 10/73 |
| 2021/0053294 A1* | 2/2021 | Vega Velasco ......... B22F 10/34 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion in PCT/US2022/034409, dated Oct. 11, 2022, 16 pages.

* cited by examiner

500

502
Obtain a characteristic of an output material, the output material being output from a first additive manufacturing process

504
Obtain an input material parameter of a second additive manufacturing process

506
Determine whether the characteristic of the output material satisfies the input material parameter of the second additive manufacturing process

508
Determine the second additive manufacturing process can accept the output material as input material if the characteristic of the output material is determined to satisfy the input material parameter of the second additive manufacturing process

FIG. 5

METHODS AND APPARATUSES FOR WIDE-SPECTRUM CONSUMPTION OF OUTPUT OF ATOMIZATION PROCESSES ACROSS MULTI-PROCESS AND MULTI-SCALE ADDITIVE MANUFACTURING MODALITIES

BACKGROUND

Field

The present disclosure generally relates to atomization processes, and more particularly, to techniques for wide-spectrum consumption of output of an atomization processes across multi-process and multi-scale additive manufacturing modalities.

Introduction

Additive manufacturing (AM) refers to various processes for fabrication of solid three-dimensional (3-D) objects. Many AM processes fabricate objects from metallic powders feedstock. However, AM processes generally have strict requirements that the feedstock must satisfy in order for the feedstock to be used. For example, many AM processes require the feedstock to be within a very small and specific size range, specific shape, such as substantially spherical, specific texture, such as substantially smooth, and the like. Such characteristics, however, may be difficult to achieve.

For example, atomization processes, such as gas atomization, plasma atomization, and the like, used in creating the metallic powder feedstock suitable for AM processes have low yield, which results in only a fraction of the created metallic powder qualified to be used in the AM process. Even when the atomization process is well controlled, for example, with specialized nozzles and/or other hardware, only 30-50 percent of the created powder is usable in an AM process. For example, even under such controlled atomization process, size of the created powder particles can vary from as low as 1 micron to as high as 125 microns.

Such low yields are one of the key drivers of high AM feedstock costs, and cause manufacturers to spend significant financial resources, energy resources, and time in handling the undesired portion of the created powder. In addition, such high costs and low yields have led manufacturers use only specific AM processes and equipment that use only specific portion of the created powder, which limits the number of components that can be manufactured and further limits AM processes from being utilized in large scale operations that may reduce the cost of using AM processes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Additive manufacturing (AM) processes involve the use of a stored geometrical model for accumulating layered materials on a "build plate" to produce three-dimensional (3-D) objects having features defined by the model. AM techniques are capable of printing complex components using a wide variety of materials. A 3-D object is fabricated based on a computer aided design (CAD) model. The AM process can create a solid three-dimensional object using the CAD model.

One such method is called Direct Metal Deposition (DMD). DMD is an AM technology that uses a laser to melt metallic powder and thereby transform it into a solid metal object. DMD is not based on a powder bed. Instead, DMD uses a feed nozzle to propel the powder into the laser beam. The powdered metal is then fused by the laser. While supports or a freeform substrate may in some cases be used to maintain the structure being built, almost all the powder in DMD is transformed into solid metal and consequently little waste powder is left to recycle. Using a layer-by-layer strategy, the print head, composed of the laser beam and the feed nozzle, can scan the substrate to deposit successive layers. All kinds of metallic materials can be processed using this technology including, for example, steel, aluminum, nickel alloys, titanium, cobalt, copper, and the like.

Other AM processes, such as powder bed fusion (PBF), may use energy beams (for example, laser) to sinter or melt metallic powder deposited in a powder bed, which then bonds the powder particles together in targeted areas to produce a 3-D structure having the desired geometry. For example, selective laser sintering (SLS) uses a laser to sinter metallic powder as the surface of a powder bed is scanned across. The laser is directed at specific points defined by a CAD model, and the metallic powder is bound together at the specific points to create a solid structure. Similar to SLS, selective laser melting (SLM) uses a high power-density laser to melt and fuse metallic powder. In SLM, however, the metallic powder may be fully melted into a solid 3-D part.

In yet other AM processes, such as binder jetting, a layer of powder may be spread and printheads may strategically deposit droplets into the powder bed. A printing plate may lower and another layer of powder is spread. Such a process is repeated until the part is completely printed. With powders of certain materials, such as metallic powders, subsequent post-processing steps may be required such as sintering and infiltration. In other AM processes, such as electron beam melting, a powder is placed under a vacuum and a high-powered electron beam is utilized to generate energy needed for high melting capacity and high productivity. The powder is fused together using the energy generated by the electron beam.

The metallic powders used in various AM processes, such as SLS, SLM, binder jetting, and/or electron beam melting may be necessarily within a well-defined size distribution—e.g., 1 micrometers (μm) to 150+ μm. For example, for an SLM process, the AM equipment may be configured to use powder between 20 to 63 micrometers. Similarly, AM equipment for PBF process may be configured to use powder between 15 to 45 micrometers, and AM equipment for EBM process may be configured to use powder between 45 to 105 micrometers. In addition, such AM processes may use metallic powders with a specific shape—e.g., substantially spherical metal powder, and/or a specific texture—e.g., substantially smooth powder particles. However, generating powder with such characteristics is difficult, and may result in 50 percent to 70 percent of the powder being wasted.

The present disclosure describes various techniques and solutions for factory architecture that allows for consumption of the entire output of powder atomization processes across multi-process and multi-scale AM processes. According to the techniques and solutions described herein, characteristics of output material of an atomization process that is unused in an AM process are determined, provide the output material to another AM process based on the characteristics of the output material and parameters associated with input material of the another AM process. The characteristics of output material may include, but are not limited to, shape, size, texture, and the like. Furthermore, the techniques and approaches described in the present disclosure allow determining one or more parameters of input material for one or more AM processes, and identifying another AM process based on the determined parameter(s) of input material and characteristics of unused output material. Such techniques and approaches may be enabled through various apparatuses, systems, methods, and/or computer-readable media described herein.

In some embodiments of the present disclosure, a method for identifying an AM process for unused output material is described. The method of identifying an AM process comprises obtaining a characteristic of an output material, the output material being output from a first additive manufacturing process. The method further comprises obtaining an input material parameter of a second additive manufacturing process. The method further comprises determining whether the characteristic of the output material satisfies the input material parameter of the second additive manufacturing process. The method further comprises determining the second additive manufacturing process can accept the output material as input material if the characteristic of the output material is determined to satisfy the input material parameter of the second additive manufacturing process.

In some embodiments of the present disclosure, an apparatus for identifying an AM process for unused output material is described. The apparatus comprises a processor communicatively connected with a memory and configured to obtain a characteristic of an output material, the output material being output from a first additive manufacturing process. The processor is further configured to obtain an input material parameter of a second additive manufacturing process. The processor is further configured to determine whether the characteristic of the output material satisfies the input material parameter of the second additive manufacturing process. The processor is further configured to determine the second additive manufacturing process can accept the output material as input material if the characteristic of the output material is determined to satisfy the input material parameter of the second additive manufacturing process.

In some embodiments of the present disclosure, a computer-readable medium storing computer-executable code for identifying an AM process for unused output material is described. The computer-readable medium comprises code, which when executed by at least one processor causes the at least one processor to obtain a characteristic of an output material, the output material being output from a first additive manufacturing process. The computer-readable medium further comprises code, which when executed by at least one processor causes the at least one processor to obtain an input parameter of a second additive manufacturing process. The computer-readable medium further comprises code, which when executed by at least one processor causes the at least one processor to determine whether the characteristic of the output material satisfies the input material parameter of the second additive manufacturing process. The computer-readable medium further comprises code, which when executed by at least one processor causes the at least one processor to determine the second additive manufacturing process can accept the output material as input material if the characteristic of the output material is determined to satisfy the input material parameter of the second additive manufacturing process.

It will be understood that other aspects of identifying an AM process for unused output material will become readily apparent to those skilled in the art from the following detailed description, wherein it is shown and described in several embodiments by way of illustration. As will be realized by those skilled in the art, the disclosed subject matter is capable of other and different embodiments and its several details are capable of modification in various other respects, all without departing from the present disclosure. Accordingly, the drawings and detailed description are to be regarded as illustrative in nature and not as restrictive. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates a flowchart of an example method for identifying an AM process for unused output material, in accordance with some other embodiments of the present disclosure.

DETAILED DESCRIPTION

Figure 1:
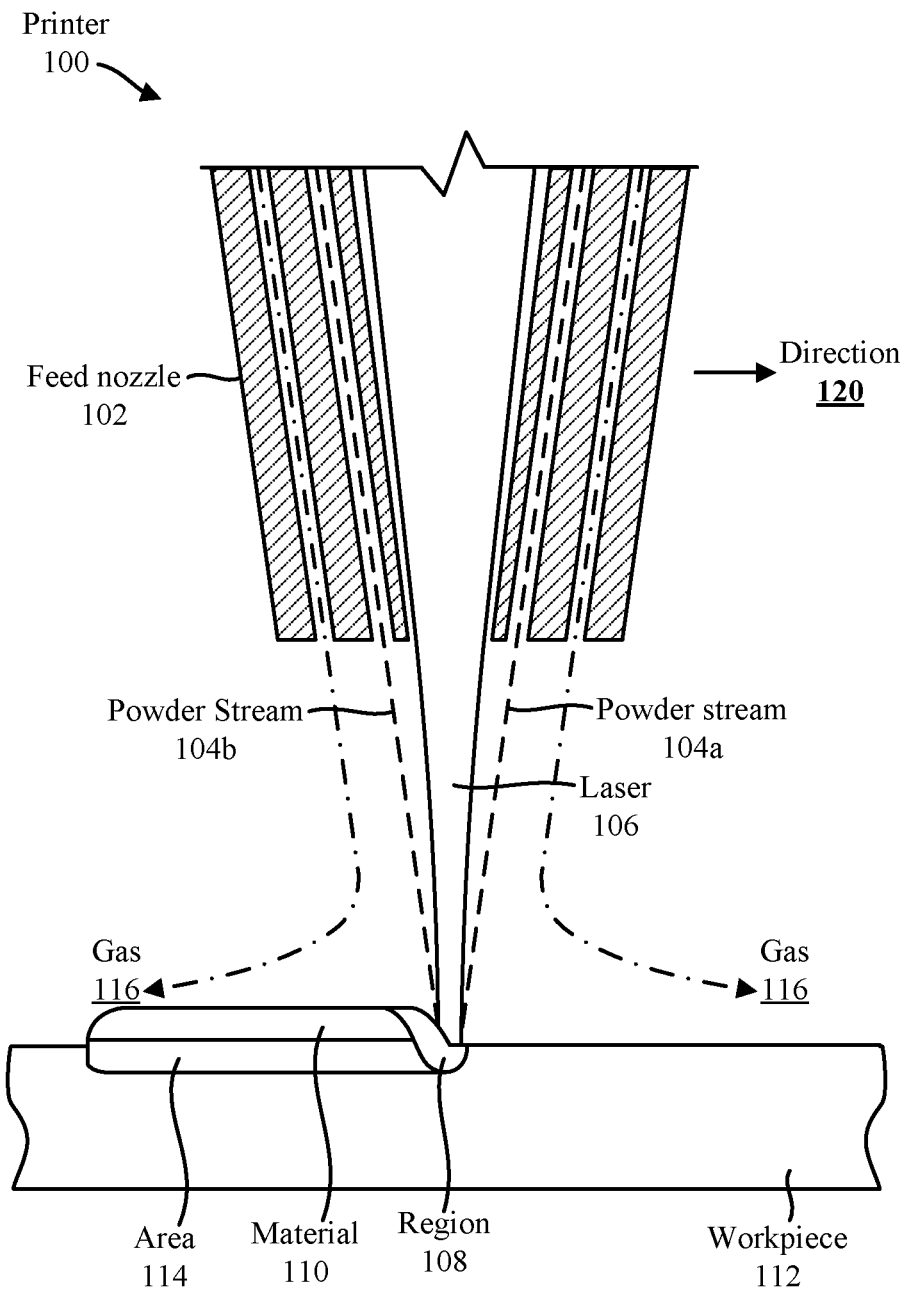
FIG. 1 illustrates an exemplary embodiment of certain aspects of a Direct Metal Deposition (DMD) three-dimensional (3-D) printer.

The detailed description set forth below in connection with the appended drawings is intended to provide a description of various exemplary embodiments and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure. In addition, the figures may not be drawn to scale and instead may be drawn in a way that attempts to most effectively highlight various features relevant to the subject matter described.

This disclosure is generally directed to wide-spectrum consumption of output material of a powder atomization process. The output material of the powder atomization process may be created for an AM process. In some implementations, the output material of a powder atomization process may be metallic powder. However, not all of the created output material may satisfy the input requirements of the AM process, and such unsatisfactory output material may be unused by the AM process. According to the present disclosure, an AM process identification system may be configured to receive the unused output material, and identify a second AM process, different from the first AM process, based on the characteristics of the unused output material. The identification system may be configured to identify a second AM process using a scanning module, which may be configured to determine one or more characteristics of the unused output material and identify an AM process based on the determined characteristic(s) of the output material and input parameters of another AM process.

Manufacturers and various other entities stand to benefit from the techniques and solutions for wide-spectrum consumption of output of atomization process described in this disclosure. Specifically, manufacturers and other entities involved in additive manufacturing (AM) and three-dimensional (3-D) printing. For example, identifying AM processes for unused output material of atomization processes using the techniques and solutions provided for in the present disclosure may be applicable in factories utilizing electron beam melting (EBM), binder jetting, selective laser melting (SLM), selective laser sintering (SLS), Direct Metal Deposition (DMD), and other powder-bed fusion (PBF)-based AM methods and practices.

In particular, the techniques and solutions for wide-spectrum consumption of output of atomization process described herein can recycle the unused material for one AM process with other AM processes, which can reduce manufacturing costs of creating output material of atomization process to be used in an AM process. For example, using the techniques and solutions described herein the manufacturing costs of such output material may only be conversion costs to create the output material of atomization process and/or any quality control related costs. The reduction in manufacturing costs can allow the manufacturers and/or other entities to utilize multiple AM processes in a single factory rather than a single AM process as utilized in current factories. Furthermore, the reduction in manufacturing costs can further allow manufacturers and/or other entities in large scale factories and for various different components.

Additive Manufacturing (3-D Printing). AM is advantageously a non-design specific manufacturing technique. AM provides the ability to create complex structures within a part. For example, nodes can be produced using AM. A node is a structural member that may include one or more interfaces used to connect to spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components. The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
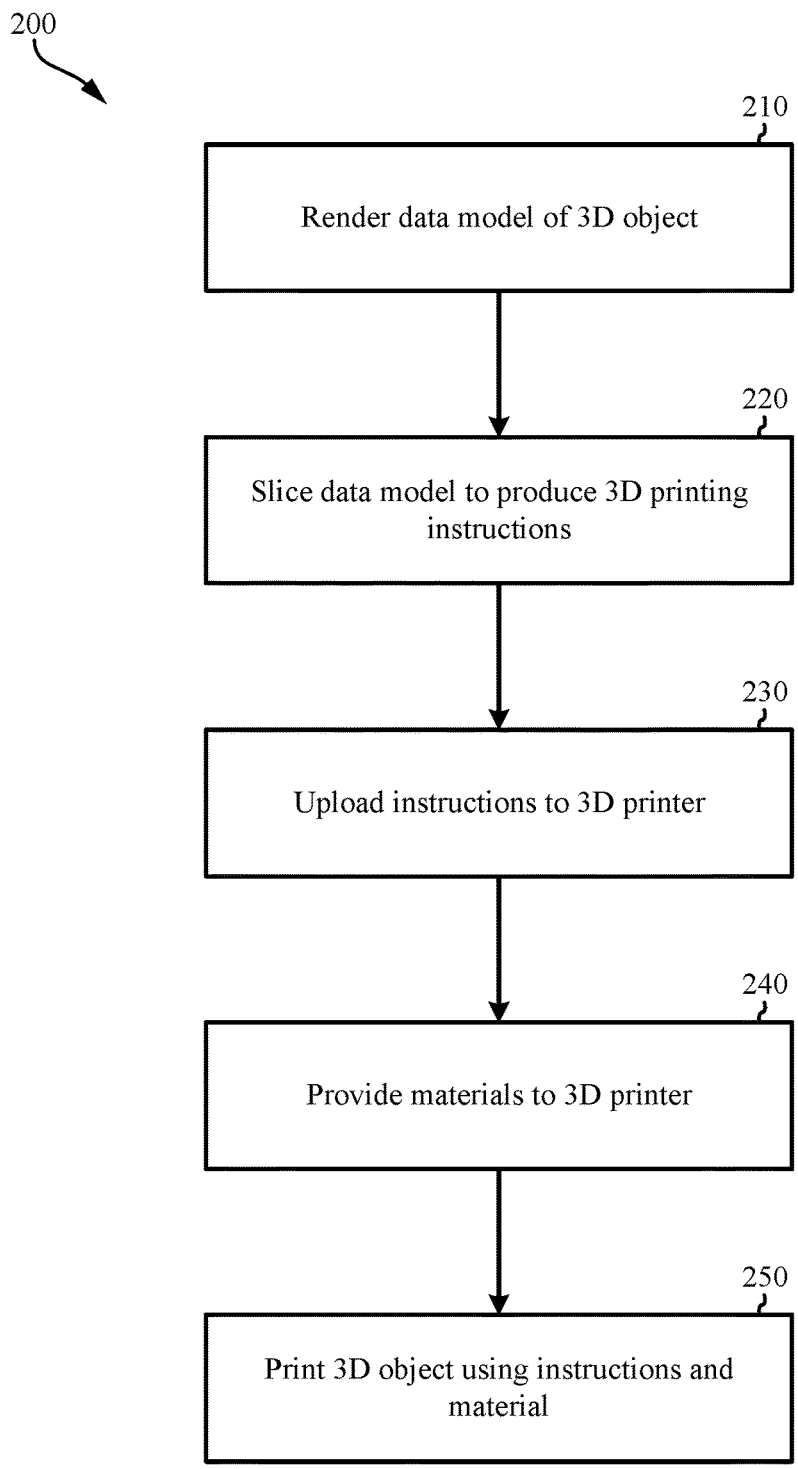
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (operation 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (operation 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (operation 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (operation 240). In DMD techniques, for example, one or more metal powders may be selected for layering structures with such metals or metal alloys. In SLM, SLS, and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (operation 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of this disclosure.

Another AM technique includes PBF. Like DMD, PBF creates "build pieces" layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of this disclosure. It should also be noted that elements of FIGS. 3A-D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
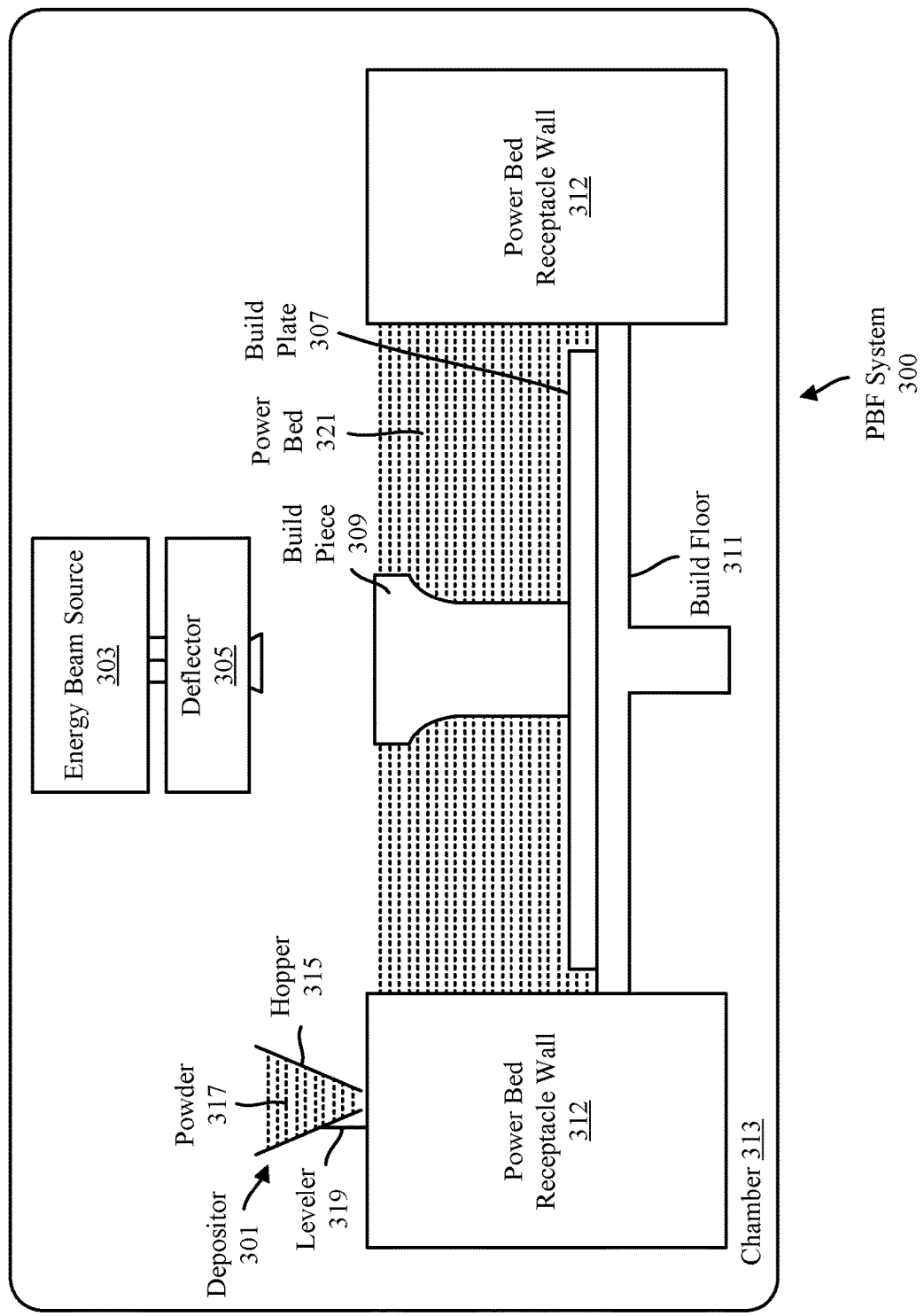
FIGS. 3A-D illustrate exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
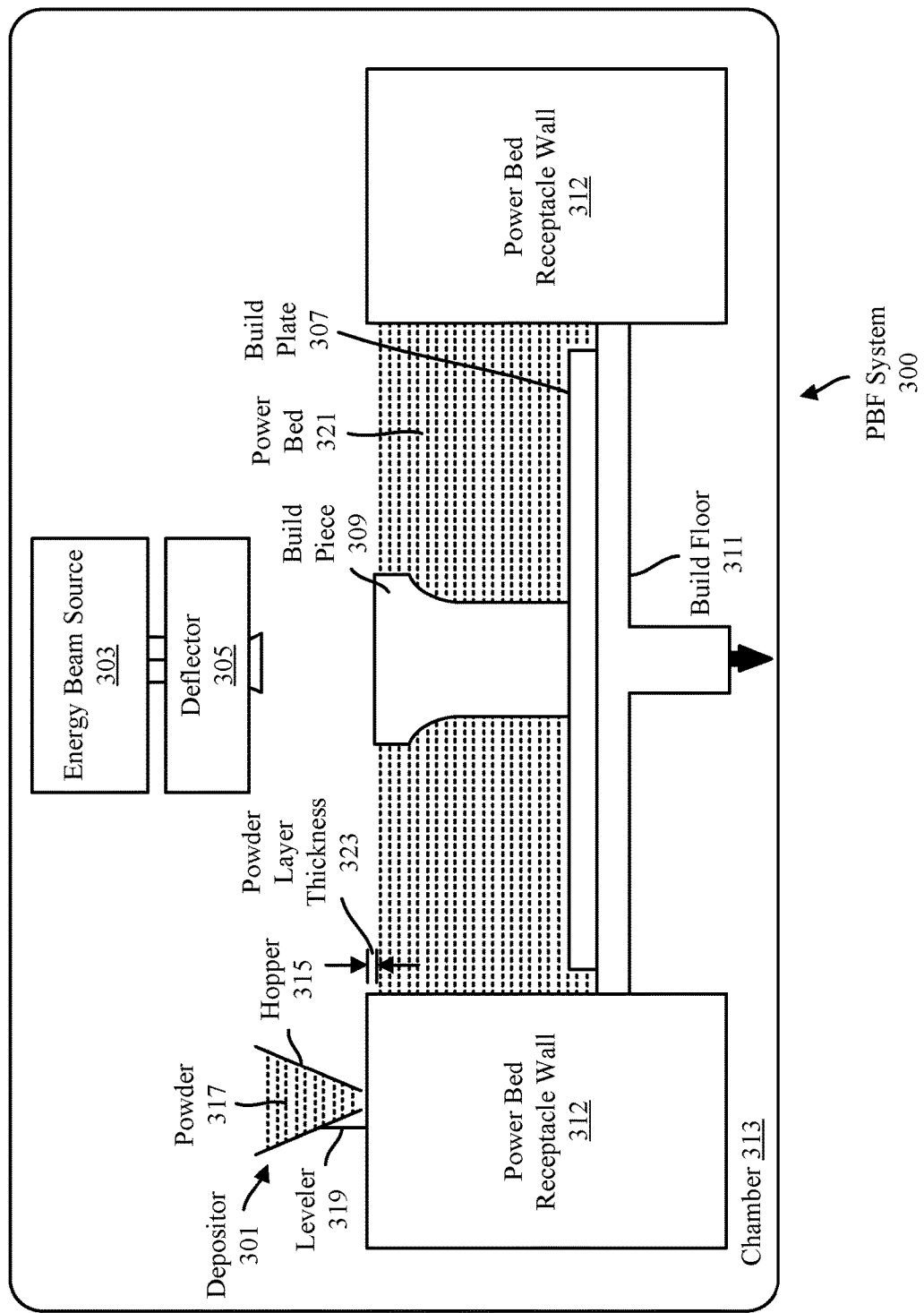

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
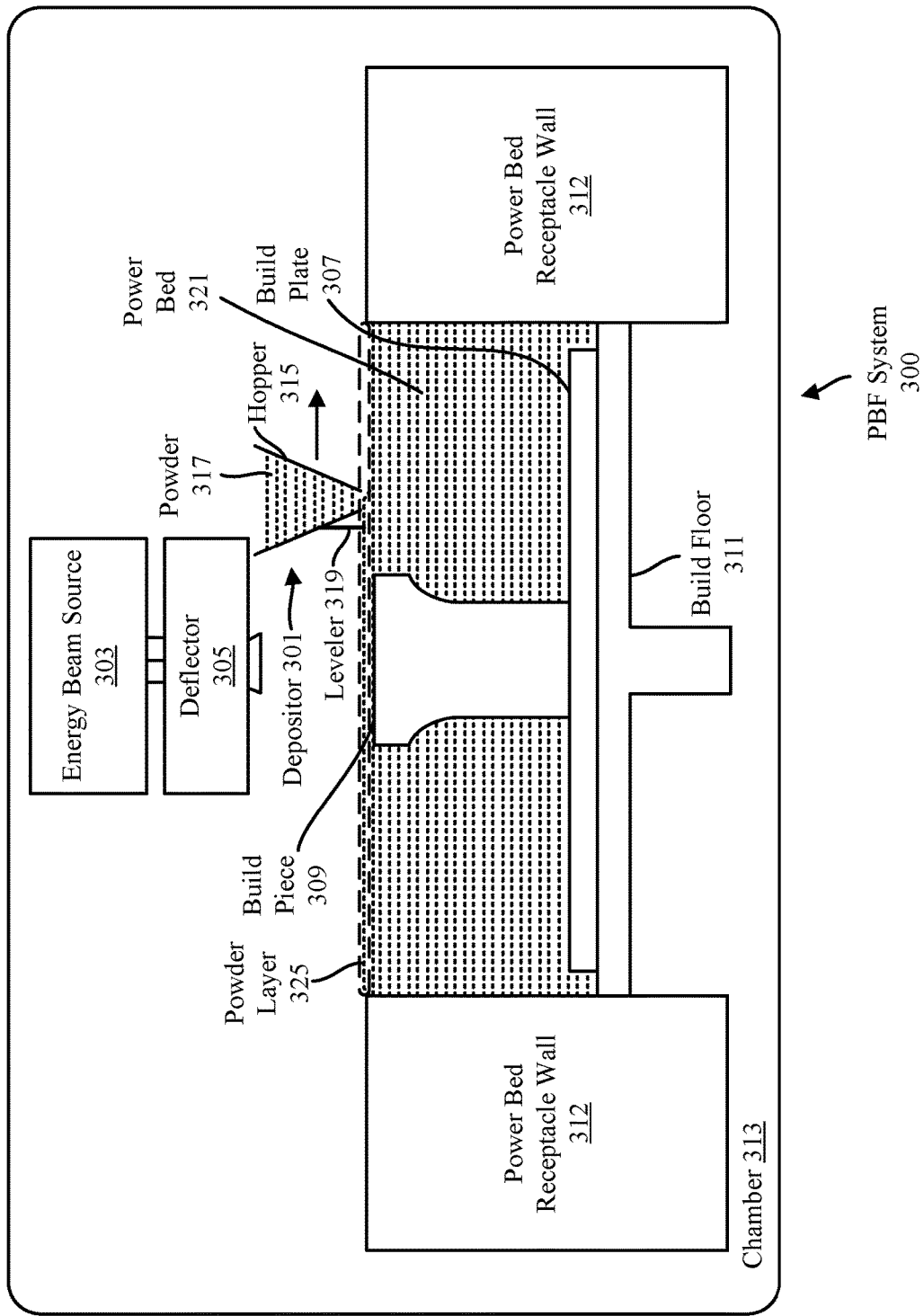

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
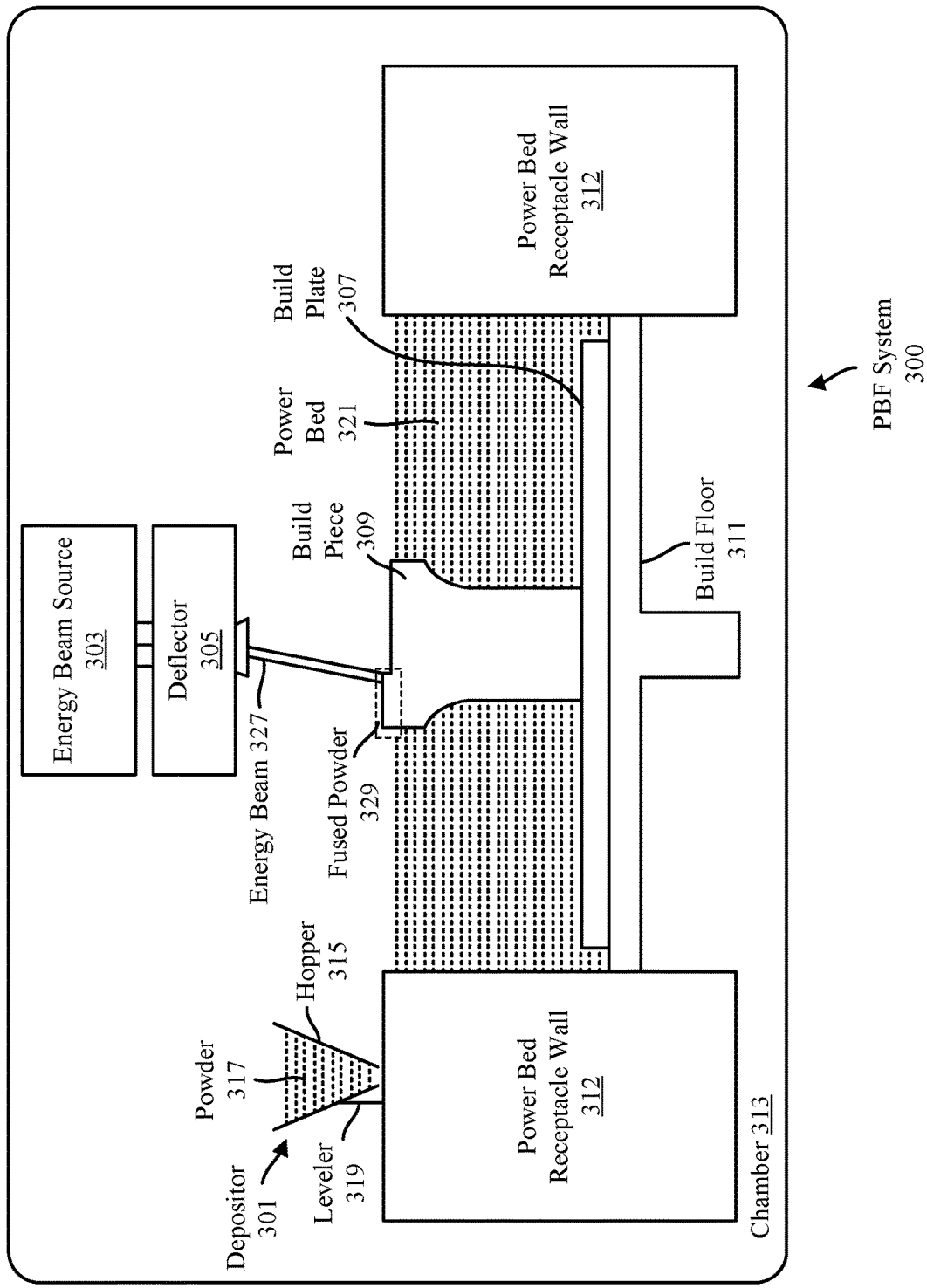

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 4:
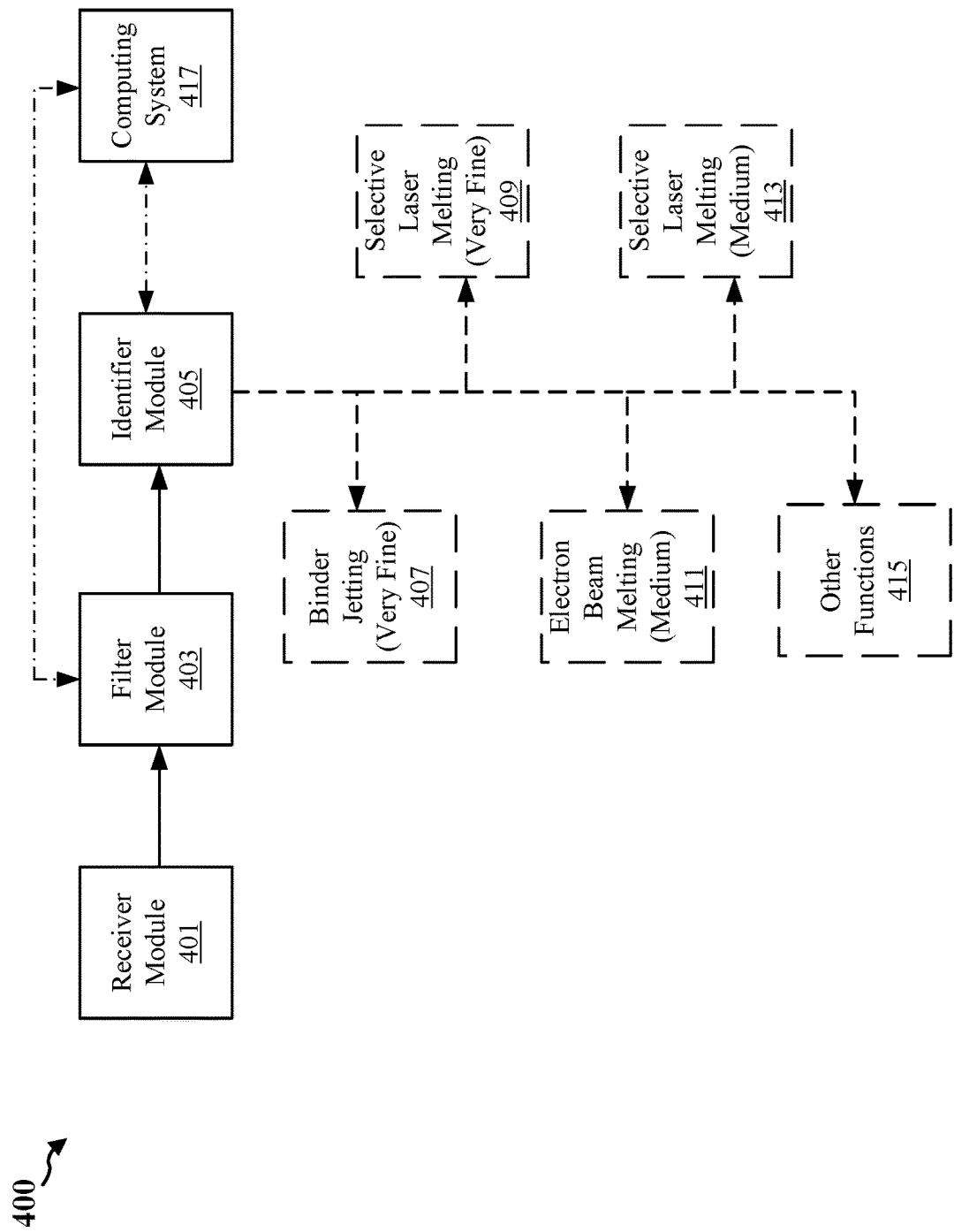
FIG. 4 illustrates an exemplary block diagram for identifying an AM process for unused output material, in accordance with some embodiments of the present disclosure.

Referring now to FIGS. 4-5, various techniques and solutions for wide-spectrum consumption of output of an atomization processes across multi-process and multi-scale additive manufacturing modalities are described. The various techniques and solutions of the present disclosure determine the characteristics of the unused output material, determine parameters of inputs to one or more AM processes, and based on the determined characteristics of the unused material and the determined parameters of one or more AM processes, identify another AM process for the unused output.

Furthermore, the various techniques and solutions for wide-spectrum consumption of output of an atomization process are advantageous over other approaches of handling unused output material of the atomization process. For example, the techniques and solutions of the present disclosure more accurately identify an AM process for which the unused output material of an atomization process will be suitable, resulting in significant reduction cost reduction in manufacturing costs of utilizing one or more AM processes in a factory.

FIG. 4 illustrates an example process 400 of identifying an AM process for unused output material of an atomization process. The example process 400 may be implemented in a factory. For example, process 400 may be implemented as part of a station for handling unused output material, a standalone AM process identification cell, and the like. The process 400 may include one or more modules, a receiver module 401, a filter module 403, an identifier module 405, as shown in FIG. 4.

The process 400 may receive unused output material of an atomization process. As described above, the output material of an atomization process may be created for an AM process, such as binder jetting process, SLM process, PBF process, DMD process, and the like. However, not all of the output material of the atomization process may satisfy the requirements of the AM process for which the output material is created. For example, if the output material of the atomization process is created for a binder jetting process that requires the material inputs to the process to be between 10-15 microns, substantially spherical and smooth, then not all of the output material of the atomization process may satisfy these requirements of this binder jetting process, and may remain unused.

Such unused output material may be provided to the receiver module 401 on a material carrying medium. Examples of material carrying medium may include, but are not limited to, bins that can hold and/or store the unused output material, a belt conveyor system, and the like. The receiver module 401 may be configured to provide the material to the filter module 403. In some implementations, the receiver module 401 may be configured to place the received unused output material on a material carrying medium such as bins, belt, and the like. In some implementations, the receiver module 401 may be connected to the filter module 403. For example, the receiver module 401 may be connected to the filter module 403 via a material carrying medium, such as a belt conveyor system, and the like.

The filter module 403 may be configured with one or more filtering mechanisms. Examples of filtering mechanisms may include, but are not limited to, one or more filters, one or more image capturing devices, one or more scanning devices (e.g., laser scanners), one or more sieving units, and the like. The one or more filters may be configured to filter material of different sizes. For example, one of the filters may be configured to filter out material that is of size less than 5 microns, another filter may be configured to filter out material between sizes of 5-10 microns, another to filter out material between sizes of 10-20 microns, another to filter out material between sizes of 20-30 microns, and so on until the filters are configured to filter out material of a desired range of sizes. In some implementations, the filter module 403 may be configured to cause the filtered material to be placed on a material carrying medium, such as bins and/or other similar structures. In some implementations, the filter module 403 may be configured to identify and track the filters that filtered the material through, and determine the size(s) of the material based on the filters that filtered through the material.

In some implementations, the filter module 403 may include one or more image capturing devices that are configured to capture one or more images and/or one or more streams of images of the material. The one or more image capturing devices may be communicatively connected to the computing system 417 and maybe configured to transmit captured image data to the computing system 417. The one or more processors of the computing system 417 may be connected to memory storing instructions thereon, and when executed, may cause the one or more processors to apply image processing techniques, configured to determine one or more characteristics (e.g., size, shape, and/or texture) of the particles and/or particulates of the material, to the received image data from filter module 403. For example, the one or more processors of the computing system 417 may be configured to apply image processing techniques configured to determine shapes (e.g., sufficiently spherical) of the output material. Similarly, the one or more processors of the computing system 417 may be configured to apply image processing techniques to determine texture of the particles of the material. For example, the one or more processors of the computing system 417 may be configured to apply image processing techniques to determine smoothness of the particles of the material.

In some implementations, the filter module 403 may include one or more scanning devices, such as laser scanners. The one or more scanning devices may be configured to scan the material received by the filter module 403 and transmit the scan data to the one or more processors of the computing system 417. The one or more processors of the computing system 417 may be configured to determine one or more characteristics of the material based on the received scan data from the one or more scanners of the filter module 403. For example, based on the received scan data, the one or more processors may be configured to determine one or more sizes of the particulates of the material. Similarly, based on the received scan data, the one or more processors of the computing system 417 may be configured to determine the shapes (e.g., sufficiently spherical), and/or texture (e.g., sufficiently smooth) of the particulates of the material.

In some implementations, the filter module 403 may include one or more sieving units. The one or more sieving units may be configured to sieve the material received by the filter module 403. The one or more sieving units may separate the received material based on one or more sizes or ranges of sizes of the particulates of the material. In some implementations, the sieving units may be used in combination with the scanning units and/or image capturing devices. The sieving units may be configured to separate the material.

In some implementations, the filter module 403 may be configured to transmit to the computing system 417 the information related to the received material based on the received material being separated by the one or more sieving units. In some implementations, the filter module 403 may transmit to the computing system 417 information related to how the received material was sieved and/or separated. For example, the filter module 403 may transmit identifiers of the bins into which the received material was separated. Similarly, in some implementations, the filter module 403 may transmit information related to the one or more sizes or ranges of sizes of the particulates of the material separated by the one or more sieving units.

The one or more processors of the computing system 417 may be configured to identify one or more parameters of input material for each of the various AM processes. In some implementations, the one or more parameters of the input material for each of the various AM processes may be predetermined by a user (e.g., a manufacturer). For example, the user may specify that for binder jetting process 407 utilized in a factory, the size of the particulates should be between 25-30 microns. Similarly, the user may specify that for SLM process 409, the size of the particulates should be between 30-50 microns, for SLM process 413, the size of the particulates should be between 70-80 microns, and for an EBM process 411, the size of the particulates may be specified to be between 90-105 microns. The user (e.g., manufacturer) may also specify other parameters, such as shape (e.g., sufficiently spherical), and/or texture (e.g., sufficiently smooth) of the input material to the various AM processes. The predetermined input parameters for the various AM processes may be stored in the computing system 417, and the one or more processors of the computing system 417 may be configured to identify the parameters of the different AM processes.

The one or more processors of the computing system 417 may be configured to determine whether the determined characteristics of the material satisfy the input parameters for the any of the AM processes. If the input parameters of an AM process are satisfied, then the one or more processors may cause the material to be provided to that AM process by transmitting instructions to the identifier module 405 to provide the material to that AM process. For example, if the determined characteristics of the material satisfy the input parameters for binder jetting process 407, then the one or more processors may cause the material to be provided to the binder jetting process by transmitting instructions to the identifier module 405 to provide the material to the binder jetting process 407.

In some implementations, a user may indicate a preference (e.g., ranking) among the various different AM processes, which may be stored in the computing system 417. For example, a user may indicate that binder jetting process 407 be given the highest preference, followed by EBM process 411, SLM process 413, and finally SLM process 409. In some implementations, if the determined characteristics of the material satisfy input parameters for two or more AM processes, then the one or more processors of the computing system 417 may be configured to select an AM process among the two or more AM processes based on the indicated preferences of the user.

If the input parameters of none of the AM process are satisfied, then the one or more processors may cause the material to be provided to an exception, such as the other functions process 415 by transmitting instructions to the identifier module 405 to provide the material to the other functions process 415. At the other functions process 415, a user and/or another system may perform addition quality checks and/or other root cause analysis to determine and/or identify the issues with the material and further transmit the material accordingly.

As described above, the filter module 403 may transmit the material to the identifier module 405. The identifier module 405 may be configured to receive instructions from the computing system 417 (e.g., from the processors of the computing system 417), and, based on the received instructions, provide the material to one of the AM process or other functions process 415.

FIG. 5 illustrates a method 500 for identifying an AM process for unused output material of an atomization process, in accordance with various embodiments of the present disclosure. The method may be implemented by a computing system (e.g., computing system 417). According to various embodiments, one or more of the illustrated operations may be transposed, omitted, and/or contemporaneously performed.

Initially, one or more characteristics of an output material is obtained, where the output material is being output and/or an output from a first additive manufacturing process (operation 502). As described above, an atomization process may output material that is desired to be used for a certain AM process, such as a PBF process. However, not all of the output material satisfy the input requirements for that AM process (e.g., for that PBF process). One or more characteristics of the output material may be obtained by one or more processors of the computing system 417. In some implementations, the one or more obtained characteristics indicates at least one of a shape, size, and/or texture of the output material. For example, the one or more obtained characteristics indicates whether particulates of the output material are spherical. In some implementations, the one or more characteristics of the output material are obtained and/or determined based on at least one of image data or scan data. The image data or scan data may be generated by one or more image capturing devices or scanner devices (e.g., image capturing or scanner devices of filter module 403). In some implementations, the output material may be sieved to obtain one or more size ranges of the output material, and the one or more characteristics of the output material may be obtained by determining a size range of the output material based on a size range of the sieved output material.

An input material parameter of a second manufacturing process is obtained (operation 504). One or more input material parameters may be determined by the one or more processors of the computing system 417 as described above with reference to FIG. 4. In some implementations, the one or more input material parameter may be determined based on a predetermined set of parameters associated with the second additive manufacturing process. The second additive manufacturing process may be one of the additive manufacturing processes described above. The second additive manufacturing process may be different from the first additive manufacturing process. The second additive manufacturing process may include, but not limited to, the binder jetting process 407, the SLM process 409, the EBM process 411, the SLM process 413.

A determination that the second additive manufacturing process can accept the output material as an input material if the characteristic of the output material is obtained to satisfy the input material parameter of the second additive manufacturing process (operation 506). The one or more processors of the computing system 417 may determine whether the characteristic of the output material satisfies the input material parameter of the second additive manufacturing process, and if the characteristic of the characteristic of the output material satisfies the input material parameter of the second additive manufacturing process, the one or more processors of the computing system 417 may determine the second additive manufacturing process can accept the output material as an input material.

In some implementations, the one or more processors of the computing system 417 may cause the output material to be provided as the input material to the second additive manufacturing process. In some implementations, the one or more processors of the computing system 417 may be configured to compare the one or more determined characteristics of the output material with one or more parameters associated with input materials of each of the other additive manufacturing processes.

In some implementations, the one or more processors of computing system 417 may obtain an input material parameter of a third additive manufacturing process. The one or more processors of computing system 417 may determine whether the one or more characteristics of the output material satisfies the input material parameter of the third additive manufacturing process. The one or more processors of computing system 417 may determine that the third additive manufacturing process can accept the output material as input material if the one or more processors of computing system 417 determine that the one or more characteristics of the output material satisfies the input material parameters of the second additive manufacturing process.

In some implementations, the one or more processors of computing system 417 may obtain preference information that indicates that the second additive manufacturing process is preferred over the third additive manufacturing process. In some implementations, based on the preference information, the one or more processors of computing system 417 may select the second additive manufacturing process instead of the third manufacturing process if both the second and the third additive manufacturing processes are determined to accept the output material as input material.

In some implementations, the preference information may be stored in a storage device and/or a memory communicatively coupled with the computing system 417 and the one or more processors of the computing 417 may be configured to obtain the preference information from the storage device and/or the memory. In some implementations, the preference information may be predetermined and stored in the storage device and/or the memory.

The preference information may indicate a preference and/or a ranking of the different additive manufacturing processes. For example, the preference information may indicate a preference indicator and/or a ranking for at least one or more of the additive manufacturing processes, such as binder jetting 407, SLM 409, EBM 411, SLM 413, and the like, that may be implemented and/or be desired to be used during a manufacturing of a component. In some implementations, the preference information may indicate a higher preference and/or ranking for binder jetting process 407 than the selective laser melting process 409. Similarly, in some implementations, the preference information may indicate a higher preference and/or ranking for the SLM process 409 than the binder jetting process 407. In some implementations, the preference information may indicate a higher preference and/or ranking for EBM 411 over the SLM 413. In some implementations, the preference information may indicate a higher preference and/or a ranking for SLM 413 over EBM 411.

In some implementations, for example, if the one or more processors of computing system 417 determines that the one or more characteristics of the output material satisfy the parameters for EBM 411 and SLM 413, then, based on obtained preference information that indicates that the SLM 413 is of a higher preference and/or ranking over EBM 411, the one or more processors of computing system 417 may determine SLM process 413 as a preferred additive manufacturing process, and select SLM process 413. In some implementations, the one or more processors of the computing system 417 may identify the selected additive manufacturing process as the additive manufacturing process to receive the output material.

In some implementations, the output material of the first additive manufacturing process may be caused to be provided as the input material to the second additive manufacturing process. For example, the one or processors may cause the output material to be provided as the input material to the second additive manufacturing process by transmitting instructions to the identifier module 405. As described above, in some implementations, the second additive manufacturing process may be one of a binder jetting process (e.g., binder jetting process 407), a selective laser melting process (e.g., SLM process 409, SLM process 413), or an electron beam melting process (e.g., EBM process 411).

Figure 6:
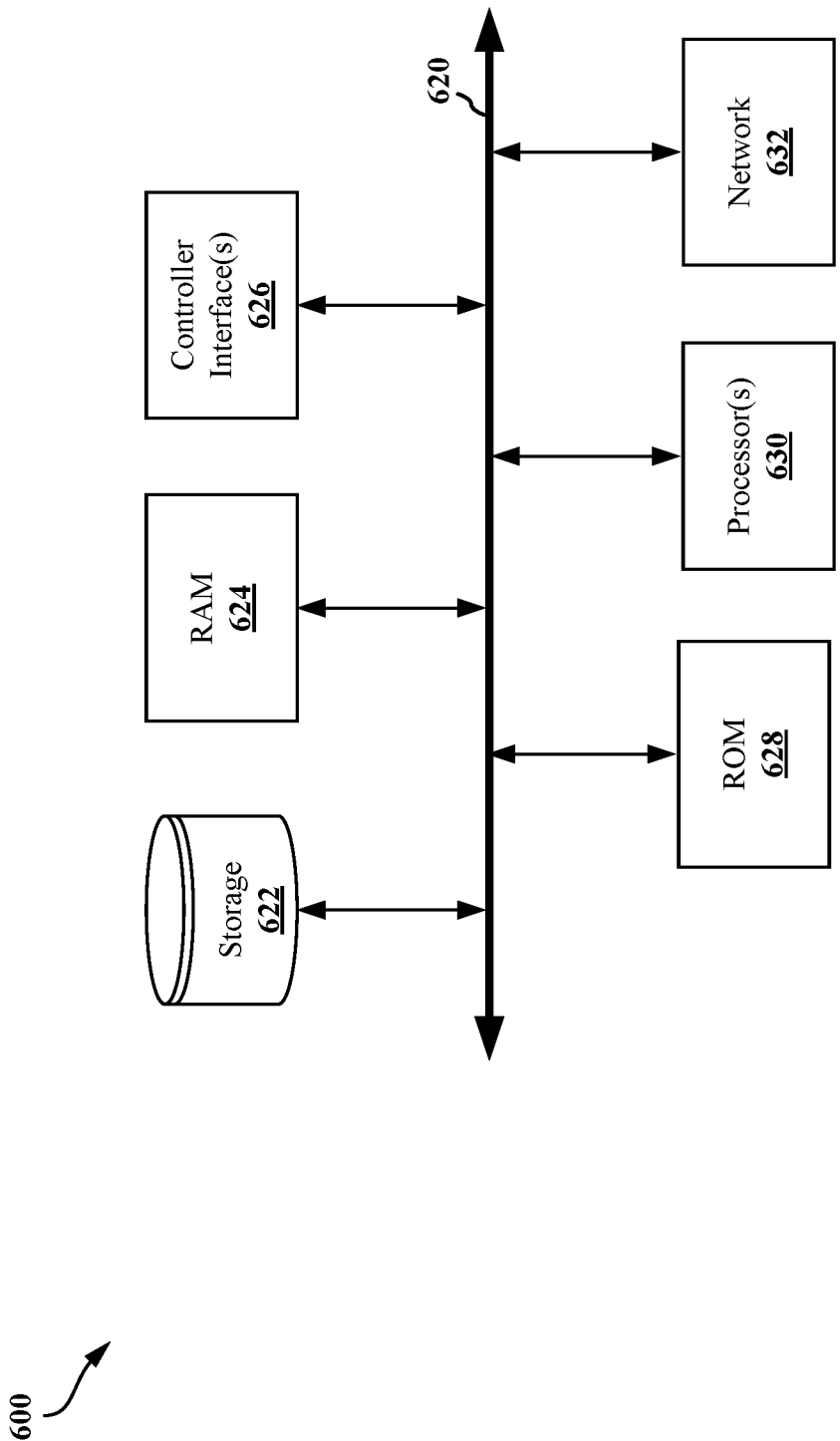
FIG. 6 is a block diagram of an example controller processing system configured to execute one or more sets of instructions to identify an AM process for unused output material.

With respect to FIG. 6, a block diagram illustrates an embodiment of a processing system 600. The processing system 600 may comprise at least one or more processors associated with at least computing system. For example, referring to FIG. 4, the processing system 600 may be an embodiment of at least one of the computing system 417

The system 600 may include various types of machine-readable media and interfaces. As illustrated, the system 600 includes at least one interconnect 620 (e.g., at least one bus), a permanent storage device 622, random-access memory (RAM) 624, at least one controller interface(s) 626, read-only memory (ROM) 628, at least one processor(s) 630, and a network component 632.

The interconnect 620 may communicatively connect components and/or devices that are collocated with the system 600, such as internal components and/or internal devices within a housing of the system 600. For example, the interconnect 620 may communicatively connect the processor(s) 630 with the permanent storage device 622, RAM 624, and/or ROM 628. The processor(s) 630 may be configured to access and load computer-executable instructions from at least one of the permanent storage device 622, RAM 624, and/or ROM 628.

The permanent storage 622 may be non-volatile memory that stores instructions and data, independent of the power state (e.g., on or off) of the system 600. For example, the permanent storage 622 may be a hard disk, flash drive, or another read/write memory device.

ROM 628 may store static instructions enabling basic functionality of the system 600, as well as the components therein. For example, ROM 628 may store instructions for the processor(s) 630 to execute a set of processes associated with robot of at least a portion of a vehicle, for example, as described with respect to one or more of the robots, above. Examples of ROM 628 may include erasable programmable ROM (EPROM) or electrically EPROM (EEPROM), compact disc ROM (CD-ROM) or other optical disk storage, magnetic disk storage or other magnetic storage devices, and/or another computer-accessible and computer-readable medium that may store program code as instructions and/or data structures.

RAM 624 may include volatile read/write memory. RAM 624 may store computer-executable instructions associated with runtime operation(s) by the processor(s) 630. In addition, RAM 424 may store real-time data captured during assembly of at least a portion of a vehicle, for example, as described with respect to one or more of FIGS. 5 through 9, above.

The processor(s) 630 may be implemented with one or more general-purpose and/or special-purpose processors. Examples of general-purpose and/or special-purpose processors may include microprocessors, microcontrollers, DSP processors, and/or any other suitable circuitry configured to execute instructions loaded from at least one of the permanent storage device 622, RAM 624, and/or ROM 628. Alternatively or additionally, the processor(s) 630 may be implemented as dedicated hardware, such as at least one field programmable gate array (FPGA), at least one programmable logic device (PLD), at least one controller, at least one state machine, a set of logic gates, at least one discrete hardware component, or any other suitable circuitry and/or combination thereof.

The interconnect 620 may further communicatively connect the system 600 with one or more controller interface(s) 626. The controller interface(s) 626 may communicatively connect the system 600 with various circuitry associated with one or more image capturing devices, scanner devices, filters, and/or other computing devices, for example, during managing of unused output material of atomization process. Instructions executed by the processor(s) 630 may cause instructions to be communicated with one or more filter modules, such as filter module 403, or identifier module, such as identifier module 405, through the controller interface(s) 626, which may cause the material to be provided to an AM process. For example, instructions executed by the processor(s) 630 may cause signals to be sent through the controller interface(s) 626 to circuitry and/or other machinery of identifier module 405 to cause the unused output material to be provided to an AM process identified by the system 600.

In some embodiments, the system 600 may include a network component 632. The network component 632 may be configured to communicate over a network, for example, in order to transmit and/or receive instructions associated with assembly of at least a portion of a vehicle. Instructions communicated over a network through the network component 632 may include instructions associated with assembly of at least a portion of a vehicle, and may be communicated before, during, and/or after assembly of at least a portion of a vehicle. Examples of a network through which the network component 632 may communicate may include a local area network (LAN), a wide area network (WAN), the Internet, an intranet, or another wired or wireless network.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
obtaining a characteristic of an output material, the output material being output from a first additive manufacturing process;
obtaining an input material parameter of a second additive manufacturing process;
obtaining an input material parameter of a third additive manufacturing process;
determining whether the characteristic of the output material satisfies the input material parameter of the second additive manufacturing process;
determining whether the characteristic of the output material satisfies the input material parameter of the third additive manufacturing process;
determining the second additive manufacturing process can accept the output material as input material if the characteristic of the output material is determined to satisfy the input material parameter of the second additive manufacturing process;
determining the third additive manufacturing process can accept the output material as input material if the characteristic of the output material is determined to satisfy the input material parameter of the third additive manufacturing process;
obtaining preference information that indicates the second additive manufacturing process is preferred over the third additive manufacturing process; and
selecting the second additive manufacturing process instead of the third manufacturing process, based on the preference information, if both the second and third additive manufacturing processes are determined to accept the output material as input material.

2. The method of claim 1, further comprising:
causing the output material to be provided as the input material to the second additive manufacturing process.

3. The method of claim 1, wherein the second additive manufacturing process is a binder jetting process, a selective laser melting process, or an electron beam melting process.

4. The method of claim 1, wherein the characteristic of the output material is based on at least a shape, a size, or a texture of the output material.

5. The method of claim 1, wherein obtaining the characteristic of the output material includes determining at least image data or scan data of the output material.

6. The method of claim 1, further comprising:
sieving the output material, wherein obtaining the characteristic of the output material includes determining a size range of the output material based on the sieving.

7. An apparatus comprising:
a processor communicatively connected with a memory and configured to:
obtain a characteristic of an output material, the output material being output from a first additive manufacturing process;
obtain an input material parameter of a second additive manufacturing process;
obtain an input material parameter of a third additive manufacturing process;
determine whether the characteristic of the output material satisfies the input material parameter of the second additive manufacturing process;
determine whether the characteristic of the output material satisfies the input material parameter of the third additive manufacturing process;
determine the second additive manufacturing process can accept the output material as input material if the characteristic of the output material is determined to satisfy the input material parameter of the second additive manufacturing process;
determine the third additive manufacturing process can accept the output material as input material if the characteristic of the output material is determined to satisfy the input material parameter of the third additive manufacturing process;
obtain preference information that indicates the second additive manufacturing process is preferred over the third additive manufacturing process; and
select the second additive manufacturing process instead of the third manufacturing process, based on the preference information, if both the second and third additive manufacturing processes are determined to accept the output material as input material.

8. The apparatus of claim 7, wherein the processor is further configured to:
cause the output material to be provided as the input material to the second additive manufacturing process.

9. The apparatus of claim 7, wherein the second additive manufacturing process is a binder jetting process, a selective laser melting process, or an electron beam melting process.

10. The apparatus of claim 7, wherein the characteristic of the output material is based on at least a shape, a size, or a texture of the output material.

11. The apparatus of claim 7, wherein the processor is configured to obtain the characteristic of the output material by determining at least image data or scan data of the output material.

12. The apparatus of claim 7, wherein the processor is further configured to:
determine a size range of the output material based on a sieving of the output material, wherein the characteristic of the output material is based on the size range.

13. A non-transitory computer-readable medium storing computer-executable code, the code when executed by at least one processor causes the at least one processor to:
obtain a characteristic of an output material, the output material being output from a first additive manufacturing process;
obtain an input material parameter of a second additive manufacturing process;
obtain an input material parameter of a third additive manufacturing process;
determine whether the characteristic of the output material satisfies the input material parameter of the second additive manufacturing process;
determine whether the characteristic of the output material satisfies the input material parameter of the third additive manufacturing process;
determine the second additive manufacturing process can accept the output material as input material if the characteristic of the output material is determined to satisfy the input material parameter of the second additive manufacturing process;
determine the third additive manufacturing process can accept the output material as input material if the characteristic of the output material is determined to satisfy the input material parameter of the third additive manufacturing process;
obtain preference information that indicates the second additive manufacturing process is preferred over the third additive manufacturing process; and
select the second additive manufacturing process instead of the third manufacturing process, based on the preference information, if both the second and third additive manufacturing processes are determined to accept the output material as input material.

14. The non-transitory computer-readable medium of claim 13, wherein the code further causes the at least one processor to:
cause the output material to be provided as the input material to the second additive manufacturing process.

15. The non-transitory computer-readable medium of claim 13, wherein the second additive manufacturing process a binder jetting process, a selective laser melting process, or an electron beam melting process.

16. The non-transitory computer-readable medium of claim 13, wherein the characteristic of the output material is based on at least a shape, a size, or a texture of the output material.

17. The non-transitory computer-readable medium of claim 13, wherein the characteristic of the output material is obtained by determining at least one of image data or scan data of the output material.

18. The non-transitory computer-readable medium of claim 13, wherein the code further causes the at least one processor to:
determine a size range of the output material based on a sieving of the output material, wherein the characteristic of the output material is based on the size range.

* * * * *